United States Patent Office 3,554,762
Patented Jan. 12, 1971

3,554,762
POLYOL CARBONATES IN CHEMICAL
LEAVENING SYSTEMS
Theodore W. Craig, Minneapolis, and Eugene H. Borochoff, St. Louis Park, Minn., assignors to General Mills, Inc., a corporation of Delaware
No Drawing. Filed Jan. 17, 1968, Ser. No. 698,407
Int. Cl. A21d 2/14
U.S. Cl. 99—92
9 Claims

ABSTRACT OF THE DISCLOSURE

Baked goods are prepared from compositions and batters wherein at least a portion of the chemical leavening system is comprised of various polyol carbonates. The polyol carbonates serve to provide an essentially steady liberation of carbon dioxide during baking.

The present invention relates to a new process for preparing baked goods and to compositions useful in such process. More particularly it relates to the use of polyol carbonates to supply carbon dioxide necessary for the leavening action required in baked goods including many cakes, breads, pastries and the like. These compounds in combination with other ingredients commonly found in leavened baked goods produce results closely matching those where conventional leavening agents are employed, but in addition have certain advantages over such conventional leavening agents.

The sustained or steady liberation of carbon dioxide to successfully produce leavened baked goods has been a continuing subject of concern to bakers and to producers of packaged mixes for home and institutional use. In the past the most common method of producing the carbon dioxide needed to leaven baked goods has been through the reaction of sodium bicarbonate and an acidulent. But the difficulty with this method lies in the selection of the acidulent for the particular mixing and baking process involved; if the reaction proceeds too quickly, or is "fast-acting," the result may be the liberation of too much carbon dioxide during the mixing stage and too little during the leavening stage. Certain acidulents such as sodium aluminum sulfate and sodium acid pyrophosphate may be employed which react with the sodium bicarbonate at a slower rate. However some of these latter reactions leave residue salt compositions of undesirable taste. Combinations of fast-acting and slower acting acidulents have been used with sodium bicarbonate, and although the evolution of carbon dioxide is more steady than with use of the fast-acting acids alone, there may still remain the problem of undesirable taste. Thus selection of the combination of acidulents is particularly a problem where delicate flavorings are used in the mix.

We have now discovered that various polyol carbonates may be used to provide sustained leavening action and thereby impart desirable structural characteristics to the baked good. These carbonates do not impart an unpleasant taste to the baked goods in which they are used, and also have the advantage of eliminating the use of a complicated variety of acidulents. An additional advantage of this invention is that when carbonates of carbohydrates such as sucrose and other common sugars are employed, the sugar residue left after carbonation is complete may be used in the baked good to substitute for a portion of the sugar in the original recipe.

The carbonates of this invention are derived from various polyols such as sucrose, glycerol, propylene glycol, sorbitol and the like. Such polyols are generally comprised of carbon, hydrogen and oxygen. Suitable polyols are those where two of the hydroxyl groups contained therein are attached to adjacent carbon atoms, or are attached to carbon atoms which are separated by a third carbon atom. These structural relationships may be described generally as

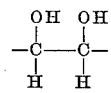

and

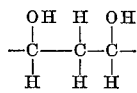

where the hydroxyl groups may be in cis or trans positions with respect to one another. Although at least one of the above structural relationships must be present in a polyol used to prepare the carbonates useful in this invention, more than that may be present, as may additional hydroxyl groups not so related to the various carbon atoms. Thus the class of polyols usable here also includes fructose, glucose, manitol, maltose and the like. Other substitutes and equivalents may include various other sugars, alkylene diols and related substances, both simple and complex, natural and synthetic.

It is thus an object of this invention to provide such new means to leaven various baked goods where the ingredients include means of chemical leavening. Other objects as well will be apparent from the description which follows.

The carbonates used in this invention may be prepared in any convenient manner, but are preferably prepared by phosgenation. For a description of the preparation of polycarbonates by phosgenation see, Schnell, Chemistry and Physics of Polycarbonates, ch. III (1964). See also, Haworth and Porter, Sugar Carbonates, Chemical Society Journal (London), 1930, pp. 151–157. Phosgenation proceeds when phosgene is introduced to a solution of the reactants in organic bases such as trimethylamine, pyridine and diethylaniline, or inert (with respect to the compositions present in this class of reactions) organic solvents such as methylene chloride, ligroin, chloroform, benzene, hexane and carbon tetrachloride, with addition of an acid-binding agent such as a tertiary amine. The preferred phosgenation reactions for the polyols of this invention employ pyridine as the solvent. The following examples describe the preparation of typical carbonates usable in the present invention.

EXAMPLE A

To a 3 l., partially jacketed 3 neck round bottom flask was added 1600 ml. pyridine, 3 ml. water and 56 g. powdered sucrose. The flask was equipped with a stirring shaft and blade and two Friederichs condensers. Water at 0° C. was circulated by means of a small centrifugal pump first through the flask jacket and then through the condensers. After the sucrose was dissolved, phosgene was added at a rate of about 1 ml./min. for a period of 3 hours during which vigorous stirring was maintained to prevent the formation of a large amount of residue on the surface of the liquid mixture. Warm water was then circulated around the water jacket to drive unreacted phosgene from the reaction mixture (phosgene boils at about 8.3° C.). Ice water was then added to the mixture to decompose the pyridine salts, and the mixture was centrifuged to separate the solid carbonate. The solid was thoroughly washed with acidic (pH about 4) water and with acetone to remove all traces of pyridine. The dry product (41 g.) was ground to a consistency convenient for incorporation into a dry mix. The decomposition range of the product was 182°–187° C. Infrared analysis of a portion of the product indicated the presence of carbonate carbonyl including cyclic five-membered ring carbonates. Little free hydroxyl absorption was indicated. A portion of the product was placed in aqueous solution (pH 8.5) at 80° F. for 100 minutes, after which time no further evolution of carbon dioxide was detectable. Measurement of the carbon dioxide evolved indicated there were about 1.5 carbonate units per sucrose units in the product which would hydrolyze under those conditions.

EXAMPLE B

To a 250 ml. Morton Flask at 0° C. was added 5.0 g. glycerol (0.054 mole) and 125 ml. anhydrous pyridine. After the glycerol had dissolved, gaseous phosgene was added for 30 minutes during which period the reaction mixture was vigorously stirred. Cold water was then added, and the solid dissolved to produce a clear, pale yellow solution. The solution was concentrated to a small volume by means of a rotary vacuum evaporator. Absolute ethanol was added and the mixture was placed in a refrigerator. Crystals in the form of white plates (4.1 g.) separated from the solution and were found to have a decomposition range of about 128–135° C. Infrared data showed the product to be a mixture of five- and six-membered carbonate rings with some intermolecular carbonate bonding between and among glycerol groups. Very little hydroxyl absorption was observed, indicating a substantial number of intermolecular carbonate linkages among glycerol groups. A portion of the product was placed in aqueous solution (pH 8.5) at 80° F. for 100 minutes, after which no further evolution of carbon dioxide was detectable. Measurement of the carbon dioxide evolved indicated that for each glycerol unit present there were about 0.6 carbonate groups present which would hydrolyze under those conditions.

When various of these carbonates thus described are mixed with the conventional ingredients of various baked goods, and when the resulting aqueous mixture, under mildly basic conditions, is subjected to baking, carbon dioxide is liberated at an essentially steady rate. The basic conditions necessary to provide appropriate catalysts are preferably within a pH range of about 8–10. At a pH greater than about 10 the evolution of carbon dioxide gas is retarded due to its being trapped in its anionic form in aqueous solution. If the pH is below about 7 some carbon dioxide gas may be evolved, but not a significant rate which would impart desired structural characteristics to the baked good. The basic conditions may be supplied by commonly available bases such as sodium hydroxide, tetrasodium pyrophosphate, sodium bicarbonate and the like. Of these many possible basic catalysts, sodium bicarbonate is preferred.

While we do not wish to be bound by this theory, it is believed that the sustained liberation of carbon dioxide made possible by the use of certain of the polyol carbonates is due to the presence of essentially three carbonate structures. These are: the six-membered carbonate ring, the five-membered carbonate ring and the carbonate comprising two ployol units joined by a carbonate linkage. These may respectively be represented structurally as

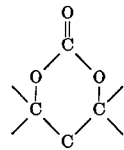

and

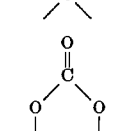

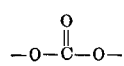

Crosslinking and limited polymerization among starting materials in the preparation of the carbonates may cause various combinations of these structures to be present in the particular carbonate molecules which are formed. It is believed that upon heating this mixture, a substantially step-wise evolution of carbon dioxide occurs due to different rates of hydrolysis for the various carbonate linkages. This theory is supported for example (L. A. Pohoryles, et al., 1960 J. Chem. Soc. 3082) by data disclosing relative rates for the alkaline hydrolysis of various six-membered ring, five-membered ring and open chain carbonates. It is thus suggested that during the baking process the six-membered ring compounds will liberate carbon dioxide first, followed by a somewhat slower evolution due to the five-membered rings and finally by more limited hydrolysis of the carbonate linkages between the polyol groups.

Suitable carbonate leavening compositions of this invention may include only those carbonates comprised of the five- or six-membered rings. However it is preferred that the carbonate be comprised of the various structures described above.

The leavening agents of this invention may be used as the sole source of carbon dioxide, or may be employed in combination with other commonly used leavening agents. Further, various of these carbonates may be used in combination with each other to provide the desired carbonation.

In each of the examples which follow a baked good was prepared using a polyol carbonate of the class described above. The descriptions of these baked products are summarized in Table I. In each example the dry ingredients were combined and mixed in a Hobart blender for twenty minutes. The shortening was then dispersed in each mix for three minutes, and the resulting semisolid mixtures were subjected to a full blade finisher. To 540 g. of each mix was added 100 g. whole eggs and 320 ml. water. Each mix was blended and then held at 500 r.p.m. for three minutes in a Hamilton-Beach mixer. The resulting batters were placed in 8 in. pans and baked at 375° F. for about 40 min. Malto-dextrin is a white hygroscopic composition resulting from the partial acid hyrolysis of a corn starch suspension, and consisting of a mixture of dextrose, maltose and dextrins; it is available commercially for example as Frodex 24, from American Maize Products Company.

EXAMPLE I

|  | Gram |
|---|---|
| Wheat flour | 670.0 |
| Sugar | 605.0 |
| Malto-dextrin | 50.0 |
| Nonfat milk solids | 10.0 |
| Salt | 8.0 |
| Vanilla | 4.0 |
| Guar gum | 3.0 |
| Shortening (rearranged lard) | 120.0 |
| Sodium carbonate | 10.0 |
| Propylene glycol monostearate | 30.7 |
| Sucrose carbonate prepared as in Example A | 48.5 |

EXAMPLE II

| Wheat flour | 434.0 |
|---|---|
| Sugar | 497.0 |
| Malto-dextrin | 77.0 |
| Nonfat milk solids | 9.7 |
| Salt | 10.3 |
| Vanilla | 3.9 |
| Guar gum | 3.2 |
| Shortening (rearranged lard) | 129.0 |
| Tetrasodiumpyrophosphate | 90.0 |
| Propylene glycol monostearate | 20.4 |
| Glycerol carbonate prepared as in Example B | 22.3 |
| Cocoa | 78.0 |

EXAMPLE III

| | Grams |
|---|---|
| Wheat flour | 526.0 |
| Sugar | 589.0 |
| Malto-dextrin | 91.5 |
| Nonfat milk solids | 11.4 |
| Salt | 12.2 |
| Vanilla | 4.6 |
| Guar gum | 3.8 |
| Shortening (rearranged lard) | 150.0 |
| Sodium carbonate | 12.0 |
| Propylene glycol monostearate | 24.1 |
| Sucrose carbonate prepared as in Example A | 48.5 |
| Cocoa | 91.5 |

Table I summarizes the descriptions of the baked products of Examples I–III. The ratings for crust, grain and tenderness are on a subjective scale of 1–10, where 1 is an exceptionally poor rating and where 10 is an exceptionally good rating. The general rating is a subjective composite of the other ratings and characteristics listed in Table I, and is on a scale of Poor—Fair—Good—Excellent.

TABLE I

| Example: | Specific gravity | Volume (cc.) | Crust | Grain | Tenderness | General rating |
|---|---|---|---|---|---|---|
| I | 0.71 | 1,400 | 10 | 10 | 10 | Good. |
| II | 0.79 | 1,275 | 8 | 8− | 8+ | Fair. |
| III | 0.73 | 1,400 | 9 | 8 | 8 | Good. |

As indicated by Table I, the baked goods were found to be of general good quality with characteristics comparable to goods prepared using various other known chemical leavening agents.

While the invention has been specifically illustrated above by preparing cakes from batters wherein the leavening system is a polyol carbonate of the class herein described, it is readily apparent that baked good of any type which rely in whole or part for structuring due to evolution of carbon dioxide during baking may be prepared by means within the scope of the invention. The vast majority of such baked goods have flour, such as wheat flour, as an essential ingredient. Where sweet products are prepared, sugar, such as sucrose, will also be included in the compositions and thus in the batters. Where the sweet products are layer cakes, shortening of various types is a common ingredient. In numerous baked goods eggs are employed, their function being to yield relatively rigid structures through the binding of other ingredients and/or the heat coagulation properties thereof. Various other conventional ingredients such as flavoring agents, colorants, non-fat milk solids and the like are also used in producing some of these baked goods. The ingredients normally and commonly used in producing these chemically leavened baked goods form no part of the invention since the invention relates only to the replacement of part or all of known chemical leavening systems with one or more of the polyol carbonates described above.

From this description it is apparent that various modifications may be made by one skilled in the art without departing from the scope and spirit of the present invention.

The embodiments of the invention in which an exclusive property or privilege is claimed are defined as follows:

1. In the process of preparing baked goods wherein a batter comprising a chemical leavening system is prepared and baked, the improvement comprising maintaining the batter at a pH of over about 7 and using a polyol carbonate in an amount sufficient to serve as at least a portion of the leavening system, such polyol carbonate providing an essentially steady liberation of carbon dioxide during baking and having at least one heat decomposable linkage $$-O-\overset{O}{\underset{\|}{C}}-O-$$

which forms a part of a five- or six-membered ring.

2. The process of claim 1 where the pH is between about 8 and 10.
3. The process of claim 1 where the baked goods are cakes.
4. The process of claim 1 where the polyol carbonate is derived from a sugar or an alkylene diol.
5. A flour containing composition for preparing baked goods, said composition including a chemical leavening system with at least a portion thereof consisting of a polyol carbonate in an amount sufficient to liberate carbon dioxide at an essentially steady rate when said composition is included in a batter at a pH of over about 7 and baked, said polyol carbonate having at least one heat decomposable linkage $$-O-\overset{O}{\underset{\|}{C}}-O-$$

which forms a part of a five- or six-membered ring.

6. The composition of claim 5 where the polyol carbonate is derived from an alkylene diol.
7. The composition of claim 5 where the polyol carbonate is derived from a sugar.
8. The composition of claim 7 where the sugar is sucrose.
9. The composition of claim 5 where the polyol carbonate is derived from glycerol.

References Cited

UNITED STATES PATENTS

| 3,097,996 | 7/1963 | Thoma et al. | 99—150X |
| 3,373,044 | 3/1968 | Thompson et al. | 99—92 |

RAYMOND N. JONES, Primary Examiner

J. R. HOFFMAN, Assistant Examiner

U.S. Cl. X.R.

99—94, 95